(12) United States Patent
Discher et al.

(10) Patent No.: US 8,876,019 B2
(45) Date of Patent: Nov. 4, 2014

(54) CLEANING DEVICE FOR A LENS OF A HEADLIGHT OF A MOTOR VEHICLE

(75) Inventors: Thomas Discher, Felsberg (DE); Matthias Goldbach, Bebra (DE); Theo Kuech, Nentershausen (DE); Annegret Kuech, legal representative, Nentershausen (DE); Uwe Martin, Bad Hersfeld (DE); Rolf-Dieter Schlein, Rotenburg a. d. Fulda (DE)

(73) Assignee: Continental Automotive GmbH, Hannover (DE)

( * ) Notice: Subject to any disclaimer, the term of this patent is extended or adjusted under 35 U.S.C. 154(b) by 474 days.

(21) Appl. No.: 11/993,183

(22) PCT Filed: Jun. 13, 2006

(86) PCT No.: PCT/EP2006/063142
§ 371 (c)(1),
(2), (4) Date: Jan. 18, 2008

(87) PCT Pub. No.: WO2006/136511
PCT Pub. Date: Dec. 28, 2006

(65) Prior Publication Data
US 2008/0210780 A1 Sep. 4, 2008

(30) Foreign Application Priority Data
Jun. 24, 2005 (DE) .......................... 10 2005 029 504

(51) Int. Cl.
*B05B 1/10* (2006.01)
*B60S 1/46* (2006.01)
*B05B 1/30* (2006.01)
*B05B 15/10* (2006.01)
*B60S 1/52* (2006.01)

(52) U.S. Cl.
CPC ...................................... *B60S 1/528* (2013.01)
USPC .................. 239/284.2; 239/284.1; 239/533.1; 239/205

(58) Field of Classification Search
USPC ................ 239/284.1, 284.2, 337, 533.1, 205; 15/250.01–250.05
See application file for complete search history.

(56) References Cited

U.S. PATENT DOCUMENTS 3,017,120 A * 1/1962 Friant et al. ................... 239/117
3,059,857 A * 10/1962 Friant et al. ................... 239/117

(Continued)

FOREIGN PATENT DOCUMENTS

DE 4011128 A1 * 10/1991
DE 19811827 3/1998 ............... B60S 1/52

(Continued)

OTHER PUBLICATIONS

International Search Report; PCT/EP2006/063142; pp. 5, Aug. 4, 2006.

(Continued)

*Primary Examiner* — Justin Jonaitis
(74) *Attorney, Agent, or Firm* — King & Spalding L.L.P.

(57) ABSTRACT

A cleaning device (1) for a lens (2) of a headlight of a motor vehicle has two telescoping tubes (6, 7), the outer tube (6) holding a spray nozzle (9). The outer tube (6) is also surrounded by a protective tube (8) to be fixed in the motor vehicle. When the outer tube (6) is pulled out (9), the spray nozzle is displaced over the lens (2). The connections of the tubes (6, 7) are reliably protected from dirt accumulation.

20 Claims, 2 Drawing Sheets

(56) References Cited

U.S. PATENT DOCUMENTS

| | | | |
|---|---|---|---|
| 4,955,543 A * | 9/1990 | Orth et al. | 239/284.2 |
| 5,242,114 A * | 9/1993 | Camier et al. | 239/284.2 |
| 5,605,286 A * | 2/1997 | Orth et al. | 239/284.2 |
| 5,762,271 A * | 6/1998 | Lind et al. | 239/284.2 |
| 5,769,323 A * | 6/1998 | Hartick et al. | 239/284.2 |
| 6,152,385 A * | 11/2000 | Nuber et al. | 239/284.2 |
| 6,186,156 B1 * | 2/2001 | Schlein | 134/105 |
| 6,234,410 B1 * | 5/2001 | Martin et al. | 239/284.2 |
| 6,438,789 B1 * | 8/2002 | Murawa et al. | 15/250.01 |
| 6,520,659 B2 * | 2/2003 | Nishiyama et al. | 362/96 |
| 6,669,110 B2 * | 12/2003 | Fukushima | 239/284.2 |
| 6,708,899 B2 | 3/2004 | Nakano et al. | 239/284.2 |
| 6,752,329 B1 * | 6/2004 | Price | 239/284.2 |
| 6,793,153 B2 * | 9/2004 | Hirose et al. | 239/284.1 |
| 6,905,078 B1 * | 6/2005 | Gattuso et al. | 239/11 |
| 6,951,223 B2 * | 10/2005 | Fukushima | 134/186 |
| 7,434,748 B2 * | 10/2008 | Takada et al. | 239/284.2 |
| 7,458,522 B2 * | 12/2008 | Hong | 239/30 |
| 7,555,807 B1 * | 7/2009 | Mastandrea | 15/313 |
| 2003/0047921 A1 | 3/2003 | Haland et al. | 239/284.1 |
| 2005/0121539 A1 * | 6/2005 | Takada et al. | 239/284.2 |
| 2006/0027678 A1 * | 2/2006 | Kimura | 239/284.2 |
| 2006/0114666 A1 * | 6/2006 | Sakai et al. | 362/96 |
| 2008/0017568 A1 * | 1/2008 | Robert et al. | 210/413 |

FOREIGN PATENT DOCUMENTS

| | | | |
|---|---|---|---|
| DE | 10125898 | 5/2001 | B05B 1/00 |
| DE | 10223187 | 5/2002 | B60S 1/60 |
| DE | 10238749 | 8/2002 | B60S 1/48 |
| EP | 0511104 | 4/1992 | B60S 1/52 |
| EP | 572147 A1 * | 12/1993 | |
| FR | 2796866 | 7/1999 | B05B 1/10 |
| GB | 2272363 A * | 5/1994 | |
| GB | 2323271 | 9/1998 | B60S 1/60 |
| JP | 3295741 A | 12/1991 | B60S 1/52 |
| JP | 5139257 A | 6/1993 | B60S 1/52 |
| JP | 6217462 | 8/1994 | G05F 1/70 |
| JP | 9277910 A | 10/1997 | B60S 1/60 |
| JP | 10258712 A | 9/1998 | B60S 1/52 |
| JP | 2000118362 A | 4/2000 | B60S 1/52 |
| JP | 2001343078 | 12/2001 | F16K 15/04 |
| JP | 2001347929 | 12/2001 | B60S 1/60 |
| JP | 2001347930 | 12/2001 | B60S 1/60 |
| JP | 2002347584 | 12/2002 | B60S 1/60 |
| JP | 200354385 | 2/2003 | B60S 1/60 |
| JP | 2003137076 A | 5/2003 | B60S 1/46 |
| JP | 2003526555 T | 9/2003 | B05B 1/00 |
| JP | 2003285723 A | 10/2003 | B05B 1/10 |

OTHER PUBLICATIONS

Japanese Office Action, Japanese application No. 2008-517461, 8 pages, Aug. 10, 2010.

* cited by examiner

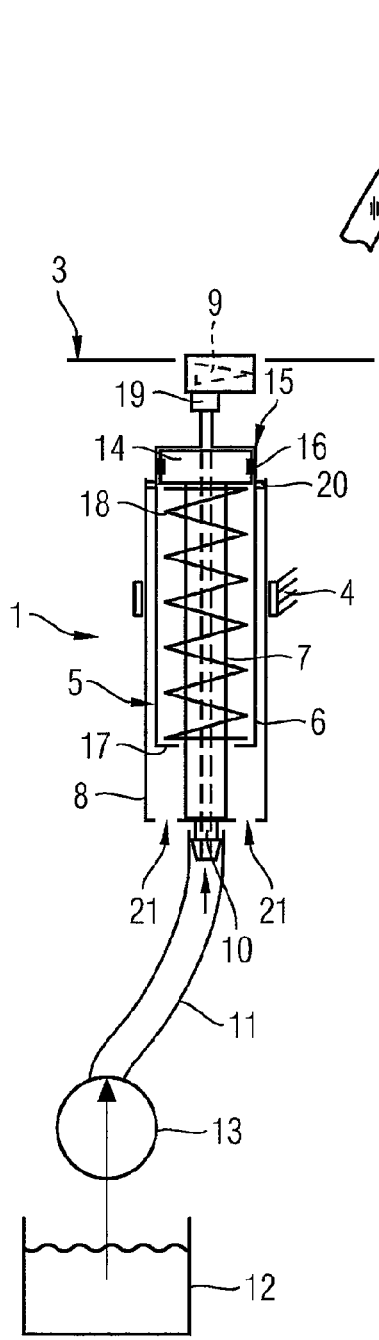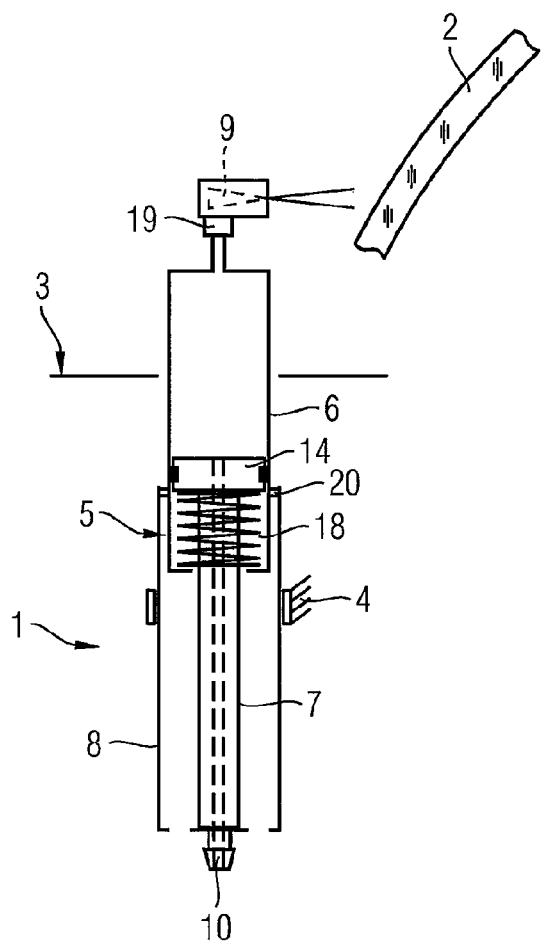

FIG 3
FIG 4
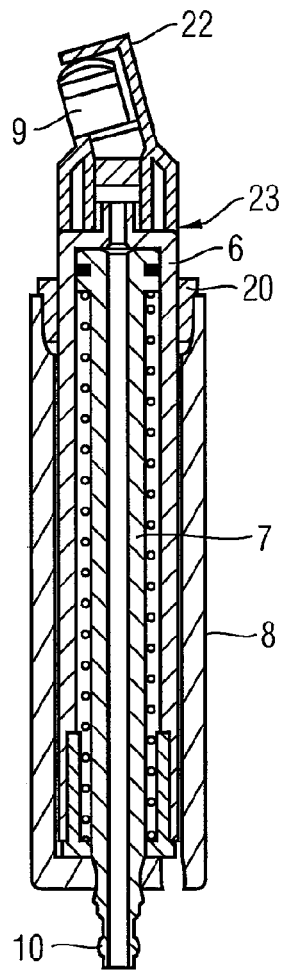
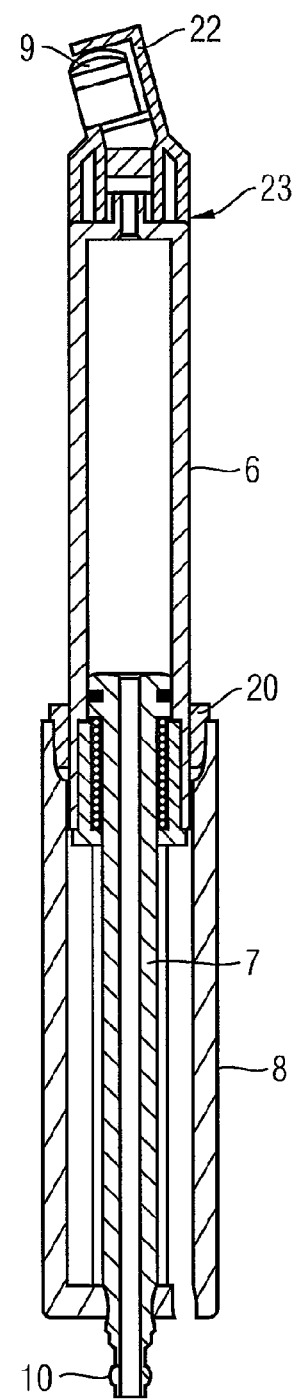

CLEANING DEVICE FOR A LENS OF A HEADLIGHT OF A MOTOR VEHICLE

CROSS-REFERENCE TO RELATED APPLICATIONS

This application is a U.S. national stage application of International Application No. PCT/EP2006/063142 filed Jun. 13, 2006, which designates the United States of America, and claims priority to German application number 10 2005 029 504.5 filed Jun. 24, 2005, the contents of which are hereby incorporated by reference in their entirety.

TECHNICAL FIELD

The invention relates to a cleaning device for a lens of a headlight of a motor vehicle, with a tubular support to be connected to a washer fluid line, with at least one spray nozzle arranged on the support, and with the support having telescoping tubes, the tubes being moveable from a basic position, in which the tubes are pushed one inside the other, into an extended position, and one of the tubes being connected to the connection for the washing fluid line and the other of the tubes being connected to the spray nozzle, and with a spring element for prestressing the telescoping tubes into the basic position, and with a washer fluid pump for producing a designated pressure in the support and at the spray nozzle.

BACKGROUND

A cleaning device of this type is frequently used in motor vehicles nowadays and is known from practice. The known cleaning device can be fitted, for example, in a motor vehicle bumper arranged in front of the lens. The tube which is connected to the spray nozzle is extended counter to the force of the spring element during operation of the washer fluid pump and therefore moves the spray nozzle over the lens. Washer fluid is subsequently sprayed on to the lens. The connection of the washer fluid line is connected to the exterior of the tubes while the interior of the tubes bears the spray nozzle. However, it is disadvantageous in this case that dirt can enter a gap between the telescoping tubes. Furthermore, in the extended state of the inner tube, dirt can pass on to the outer wall thereof. In the most unfavorable case, said dirt can block the movement of the inner tube in relation to the outer tube or can impair sealing between the tubes.

It could be conceivable to protect the tubes against dirt accumulation by means of a sleeve or the like. However, this requires a high structural outlay.

SUMMARY

A cleaning device of the type mentioned at the beginning can be developed in such a manner that it is constructed particularly simply and is as unsusceptible as possible to dirt accumulation.

According to an embodiment, a cleaning device for a lens of a headlight of a motor vehicle, may comprise a tubular support to be connected to a washer fluid line, at least one spray nozzle arranged on the support, wherein the support having telescoping tubes, the tubes being moveable from a basic position, in which the tubes are pushed one inside the other, into an extended position, and one of the tubes being connected to the connection for the washing fluid line and the other of the tubes being connected to the spray nozzle, a spring element for prestressing the telescoping tubes into the basic position, and a washer fluid pump for producing a designated pressure in the support and at the spray nozzle, wherein the tube of the support which is connected to the spray nozzle surrounds the tube which is connected to the connection for the washer fluid line, wherein the tube which is connected to the connection of the washer fluid line bears a sealing element which bears in a sealing manner against the inner wall of the tube which is connected to the spray nozzle, and in that the tube which is connected to the connection for the washer fluid line has a radial widened portion at its end projecting into the tube which is connected to the spray nozzle, and in that the sealing element is arranged on the radial widened portion.

According to a further embodiment, the radial widened portion may have a groove for receiving the sealing element. According to a further embodiment, the spring element may be supported on the radial widened portion and a radially inwardly pointing collar of the tube which is connected to the spray nozzle. According to a further embodiment, a valve can be arranged upstream of the spray nozzle, seen in the direction of flow. According to a further embodiment, above a designated pressure, the valve may switch from a closed position into an open position. According to a further embodiment, the pressure at which the valve switches into the open position can be greater than the pressure for the extension of the telescoping tubes. According to a further embodiment, the valve can be designed as a nonreturn valve. According to a further embodiment, the support may have a protective tube surrounding the tube which is connected to the spray nozzle, and the protective tube can be connected immovably to the connection for the washer fluid line. According to a further embodiment, the protective tube may have a flange for connection to a fixed component of the motor vehicle. According to a further embodiment, the protective tube may have, at its end facing away from the connection for the washer fluid line, a scraper which bears against the tube which is connected to the spray nozzle. According to a further embodiment, the protective tube may have an opening at its end facing away from the scraper. According to a further embodiment, the tube which is connected to the spray nozzle may have coupling means for connection to a connecting piece which has the spray nozzle.

BRIEF DESCRIPTION OF THE DRAWINGS

The invention permits numerous embodiments. To further clarify its basic principle, one of these is illustrated in the drawing and is described below. In the drawing FIG. 1 shows, schematically, a cleaning device according to an embodiment in a basic position, FIG. 2 shows, schematically, the cleaning device according to an embodiment from FIG. 1 in an extended position, FIG. 3 shows a sectional illustration through an embodiment of the cleaning device from FIG. 1 in a basic position, FIG. 4 shows the cleaning device according to an embodiment from FIG. 3 in an extended position.

DETAILED DESCRIPTION

According to an embodiment the tube of the support which is connected to the spray nozzle surrounds the tube which is connected to the connection for the washer fluid line, and in that the tube which is connected to the connection of the washer fluid line bears a sealing element which bears in a sealing manner against the inner wall of the tube which is connected to the spray nozzle.

By means of this design, the exterior of the tubes is moved during operation of the washing fluid pump. The cleaning system according to an embodiment therefore does not have a gap on the side of the spray nozzle, in which dirt can accumulate. The exterior of the telescoping tubes therefore provides protection for the interior of the tubes, and therefore, when the tubes are moved, the risk of dirt accumulating in the inner tube is avoided. By this means, the cleaning device according to an embodiment is constructed particularly simply and is particularly unsusceptible to dirt accumulation.

The cleaning device according to an embodiment turns out to be particularly simple structurally if the tube which is connected to the connection for the washer fluid line has a radial widened portion at its end projecting into the tube which is connected to the spray nozzle, and if the sealing element is arranged on the radial widened portion. Furthermore, this enables the movement of the tube which is connected to the spray nozzle to be particularly low in friction.

The structural outlay of the cleaning device according to an embodiment is further reduced if the radial widened portion has a groove for receiving the sealing element. The sealing element is preferably designed as a sealing ring, for example as an "O-ring".

The cleaning device according to an embodiment turns out to be particularly compact and can therefore be fitted particularly simply in the motor vehicle if the spring element is supported on the radial widened portion and a radially inwardly pointing collar of the tube which is connected to the spray nozzle.

According to another embodiment, the emergence of washer fluid from the spray nozzle can be controlled in a simple manner if a valve is arranged upstream of the spray nozzle, seen in the direction of flow.

According to another embodiment, the control of the flow of washer fluid through the spray nozzle requires a particularly low structural outlay if, above a designated pressure, the valve switches from a closed position into an open position.

In the extended position of the tubes, the cleaning of the lens takes place without further control actions, according to another embodiment, if the pressure at which the valve switches into the open position is greater than the pressure for the extension of the telescoping tubes. By means of this design, the valve is closed when the washer fluid pump does not build up any pressure. To begin the operation of the washer fluid pump, the tube which is connected to the spray nozzle is first of all extended.

In the extended position, the tube which is connected to the spray nozzle remains in its position. The further operation of the washer fluid pump results in further pressure being able to build up upstream of the valve until the valve switches into the open position. Only then does washer fluid pass to the spray nozzle and therefore of the lens to be cleaned. This design permits a particularly simple control of the cleaning device according to an embodiment via the washer fluid pump and without further controlling means.

Penetration of air into the telescoping tubes could result in, after the starting of the washer fluid pump, the cleaning device according to an embodiment conveying washer fluid through the spray nozzle only with a time delay, since first of all the air on the flow side upstream of the spray nozzle has to be displaced. The cleaning device according to an embodiment permits a delay-free start if the valve is designed as a nonreturn valve. The design of the valve as a nonreturn valve prevents air from penetrating the region upstream of the spray nozzle. Of course, the valve may also have two valve bodies connected consecutively, with one of the valve bodies preventing air from penetrating the support even at low differences in pressure and the other of the valve bodies switching into the open position when the washer fluid is at the designated pressure.

The installation of the cleaning device according to an embodiment turns out to be particularly simple if the support has a protective tube surrounding the tube which is connected to the spray nozzle, and if the protective tube is connected immovably to the connection for the washer fluid line. By this means, the cleaning device can be fastened in the motor vehicle by means of the protective tube. The connection for the washer fluid line is likewise fixed immovably in the motor vehicle, and therefore, when the spray nozzle is moved, the washer fluid line remains immovably in the motor vehicle. The protective tube can be fastened in the motor vehicle, for example, by means of a clamping first.

The installation of the cleaning device according to an embodiment is further simplified if the protective tube has a flange for connection to a fixed component of the motor vehicle.

According to another embodiment, the possibility of dirt accumulating in the telescoping tubes is reduced if the protective tube has, at its end facing away from the connection of the washer fluid line, a scraper which bears against the tube which is connected to the spray nozzle. The scraper can optionally be designed as a brush for holding back dust or the like or as a sealing element for holding back moisture.

According to another embodiment, moisture penetrating the protective tube can be removed in a simple manner if the protective tube has an opening at its end facing away from the scraper.

Lenses of headlights of motor vehicles nowadays generally have different dimensions. Two spray nozzles are therefore frequently provided for particularly large lenses while generally one spray nozzle suffices for small lenses. The adaptation of the cleaning system according to an embodiment to different lenses requires a particularly low outlay, according to another embodiment, if the tube which is connected to the spray nozzle has coupling means for connection to a connecting piece which has the spray nozzle. By means of this design, for the adaptation of the cleaning system according to an embodiment to different lenses, a correspondingly provided connecting piece can be fitted with the corresponding number and type of spray nozzles on the outer tube. The remaining components of the cleaning system according to an embodiment can therefore be manufactured as identical parts for different spheres of use.

FIG. 1 shows, schematically, a cleaning device 1 according to an embodiment for a lens 2 of a headlight of a motor vehicle in a basic position. The cleaning device 1 is fastened to a motor vehicle body part 4 arranged below a bumper 3 and has a support 5 with telescoping tubes 6, 7. The exterior of the tubes 6 is surrounded by a protective tube 8 fastened to the body part 4, and is connected to a spray nozzle 9 while the other of the tubes 7 is connected to a connection for a washer fluid line 11. The washer fluid line 11 is connected to a washer fluid pump 13 conveying washer fluid out of a washer fluid container 12. The tube 7 which is connected to the connection 10 for the washer fluid line 11 is arranged within the tube 6 which is connected to the spray nozzle 9, has a radial widened portion 14 at its end facing away from the connection 10. A groove 15 for receiving a sealing element 16 is arranged in the radial widened portion 14. The sealing ring 16 seals the inner tube 7 in relation to the outer tube 6. A spring element 18 which is supported against the radial widened portion 14 and an inwardly pointing collar 17 of the tube 6 which is connected to the spray nozzle 9 prestresses the cleaning device 1 into the position illustrated. Furthermore, a valve 19 is arranged upstream of the spray nozzle 9. Above a designated pressure of, for example, 1.6 bar, the valve 19 opens and is also designed as a nonreturn valve. The protective tube 8 bears a scraper 20, which bears against the tube 6 which is connected to the spray nozzle 9, and has a plurality of openings 21 in the bottom region.

During operation of the washer fluid pump 13, a pressure is built up within the tubes 6, 7, the pressure first of all leading, when the valve 19 is closed, to the tubes 6, 7 being pushed apart, as illustrated in FIG. 2. In the process, the spray nozzle 9 is moved into an extended position over the lens 2. Only when the spring element 18 is compressed to its full extent can the tube 6 which is connected to the spray nozzle 9 not be extended further. Pressure then continues to be built up within the tubes 6, 7 until the valve 19 opens and the washer fluid passes to the spray nozzle 9. The spray nozzle 9 subsequently sprays washer fluid on to the lens 2.

As FIGS. 1 and 2 show, the protective tube 8 with the connection 10 for the washer fluid line 11 is held immovably in every operating position of the cleaning device 1. Since the exterior of the tubes 6 is connected to the spray nozzle 9 and is extended during operation of the cleaning device 1, the connection of the two tubes 6, 7 is protected against dirt accumulation from the side of the lens 2. Moisture penetrating past the scraper 20 into the protective tube 8 can flow away through the openings 21 next to the connection 10 for the washer fluid line 11.

FIGS. 3 and 4 show an embodiment of the cleaning device from FIGS. 1 and 2 in a sectional illustration in a basic position and in an extended position. It can be seen in this case that the spray nozzle 9 is arranged on a connecting piece 22. The connecting piece 22 is connected to the exterior of the tube 6 via coupling means 23. If different spray nozzles 9 are to be used for different lenses 2, illustrated in FIGS. 1 and 2, only the connecting piece 22 connecting to the spray nozzle 9 therefore has to be exchanged. The remaining components can be used for any lens 2. The coupling means 23 can be, for example, a screw connection, a latching connection or an adhesive bond.

What is claimed is:

1. A cleaning device for a lens of a headlight of a motor vehicle, comprising:
    a tubular support to be connected to a washer fluid line,
    at least one spray nozzle arranged on the support, wherein the support comprises a first tube, the first tube being moveable from a basic position, in which the first tube surrounds a second tube, into an extended position, in which the first tube forms an extension of the second tube, wherein the second tube is connected to a connection for the washer fluid line and the first tube is connected to the spray nozzle, wherein a protective tube surrounds at least a portion of the first tube, and wherein the protective tube is connected immovably with respect to the connection for the washer fluid line
    a spring element for prestressing the first tube into the basic position, and
    a washer fluid pump for producing a designated pressure in the support and at the spray nozzle, wherein the second tube bears a sealing element which bears in a sealing manner against the inner wall of the first tube, and wherein the second tube has an end projecting into the first tube, the end of the second tube including (a) an opening and (b) a radial widened portion at which the sealing element is arranged,
    the first tube, second tube, and spring element defining a pressure-based extension system in which the first tube moves from the basic position to the extended position in response to fluid pressure caused by delivery of washer fluid into the first tube via the opening at the end of the second tube,
    wherein throughout a spraying operation of the cleaning device, including during movement of the first tube from the basic position to the extended position, the second tube remains in a stationary, fixed position relative to the protective tube.

2. The cleaning device according to claim 1, wherein the radial widened portion has a groove for receiving the sealing element.

3. The cleaning device according to claim 1, wherein the spring element is supported on the radial widened portion and a radially inwardly pointing collar of the tube which is connected to the spray nozzle.

4. The cleaning device according to claim 1, wherein a valve is arranged upstream of the spray nozzle, seen in the direction of flow.

5. The cleaning device according to claim 4, wherein, above a designated pressure, the valve switches from a closed position into an open position.

6. The cleaning device according to claim 4, wherein the pressure at which the valve switches into the open position is greater than the pressure for the extension of the first tube.

7. The cleaning device according to claim 4, wherein the valve is designed as a nonreturn valve.

8. The cleaning device according to claim 1, wherein the protective tube has openings for allowing moisture that entered between the protective tube and the second tube to flow out of the protective tube.

9. The cleaning device according to claim 1, wherein the protective tube has a flange for connection to a fixed component of the motor vehicle.

10. The cleaning device according to claim 1, wherein the protective tube has, at its end facing away from the connection for the washer fluid line, a scraper which bears against the tube which is connected to the spray nozzle.

11. The cleaning device according to claim 10, wherein the protective tube has an opening at its end facing away from the scraper.

12. The cleaning device according to claim 1, wherein the first tube has coupling means for connection to a connecting piece which has the spray nozzle.

13. A cleaning device for a lens of a headlight of a motor vehicle, comprising:
    a tubular support connected to a washer fluid line,
    at least one spray nozzle arranged on the tubular support, wherein the cleaning device has a spray nozzle tube being moveable from a basic position, in which the spray nozzle tube surrounds a washer fluid tube which is attached to said tubular support, into an extended position, wherein a protective tube surrounds at least a portion of both the washer fluid tube and the spray nozzle tube, and wherein the protective tube is connected immovably to the connection for the washer fluid line;
    a spring element for prestressing the spray nozzle tube into the basic position, and
    a washer fluid pump for producing a designated pressure in the support and at the spray nozzle, wherein the spray nozzle tube surrounds the washer fluid tube, wherein the washer fluid tube bears a sealing element which bears in a sealing manner against the inner wall of the spray nozzle tube, and wherein the washer fluid tube has an end projecting into the spray nozzle tube, the end of the spray nozzle tube including (a) an opening and (b) a radial widened portion at which the sealing element is arranged, the spray nozzle tube, washer fluid tube, and spring element defining a pressure-based extension system in which the spray nozzle tube moves from the basic position to the extended position in response to fluid pressure caused by delivery of washer fluid into the spray nozzle tube via the opening at the end of the washer fluid tube, wherein throughout a spraying operation of the cleaning device, including during movement of the spray nozzle tube from the basic position to the extended position, the washer fluid tube remains in a fixed position relative to the protective tube.

14. The cleaning device according to claim 13, wherein the radial widened portion has a groove for receiving the sealing element.

15. The cleaning device according to claim 13, wherein the spring element is supported on the radial widened portion and a radially inwardly pointing collar of the spray nozzle tube.

16. The cleaning device according to claim 13, wherein a valve is arranged upstream of the spray nozzle, seen in the direction of flow.

17. The cleaning device according to claim 16, wherein, above a designated pressure, the valve switches from a closed position into an open position.

18. The cleaning device according to claim 16, wherein the pressure at which the valve switches into the open position is greater than the pressure for the extension of the spray nozzle tube.

19. The cleaning device according to claim 16, wherein the valve is designed as a nonreturn valve.

20. The cleaning device according to claim 13, wherein the protective tube has openings for allowing moisture that entered between the protective tube and the second tube to flow out of the protective tube.

* * * * *